United States Patent

[11] 3,632,266

[72] Inventor Thomas W. Winstead
    2 Overlook Lane, Baltimore, Md. 21210
[21] Appl. No. 864,294
[22] Filed Oct. 3, 1969
[45] Patented Jan. 4, 1972
    Continuation of application Ser. No.
    729,856, Apr. 2, 1968, now abandoned,
    which is a division of application Ser. No.
    508,417, Nov. 18, 1965, now abandoned.
    This application Oct. 3, 1969, Ser. No.
    864,294

[54] CONTINUOUS APPARATUS FOR EXTRUDING AND FORMING THERMOPLASTIC ARTICLES
    9 Claims, 3 Drawing Figs.
[52] U.S. Cl. .................................................. 425/326,
    425/4, 425/243, 425/294, 425/385, 264/54, 425/388
[51] Int. Cl. .................................................. B29d 23/03
[50] Field of Search ........................................ 18/2 W, 4 S,
    5 F, 5 P, 6 F, 8 QD, 12 F, 12 TB, 12 TF, 12 TT, 12
    R, 19 F, DIG. 16, DIG. 55; 264/52, 54, 55

[56] References Cited
    UNITED STATES PATENTS

| | | | |
|---|---|---|---|
| 3,091,808 | 6/1963 | Dakin | 18/19 F |
| 3,111,714 | 11/1963 | Branscum | 18/DIG. 55 |
| 3,234,594 | 2/1966 | Winstead | 18/12 M |
| 3,331,103 | 7/1967 | Fox | 18/14 S |
| 3,431,163 | 3/1969 | Gilbert | 18/5 P X |

Primary Examiner—H. A. Kilby, Jr.
Attorney—Raphael Semmes

ABSTRACT: Apparatus for extruding a sheet of foamed thermoplastic material having an expanded, cellular, inner structure and a thin, unexpanded, molecularly integrated skin of the same material covering at least one side thereof, and, without interruption, forming thermoplastic articles therefrom. The skin is formed by controlling the temperature of the desired surface of a foamable thermoplastic sheet immediately after it is extruded so as to prevent the expanding and foaming of said surface.

INVENTOR
THOMAS W. WINSTEAD
BY Raphael Semmes
ATTORNEY

CONTINUOUS APPARATUS FOR EXTRUDING AND FORMING THERMOPLASTIC ARTICLES

This application is a continuation of Ser. No. 729,856, filed Apr. 2, 1968, now abandoned, which is a division of application Ser. No. 508,417, filed Nov. 18, 1965, now abandoned, for "Continuous Method and Apparatus For Extruding and Forming Thermoplastic Articles."

This invention relates to a continuous apparatus for extruding foamed thermoplastic material, and, without interruption, forming thermoplastic articles therefrom. More particularly, the invention consists in new and useful improvements in such a continuous apparatus designed to provide foamed thermoplastic articles, such as trays or the like, from an extrudate having an expanded, cellular, inner structure and a relatively thin, unexpanded skin of the same material, molecularly integral with the expanded structure, covering at least one surface of the extrudate or selected areas thereof for reinforcing and stiffening purposes.

In my copending application Ser. No. 475,734, filed July 29, 1965, now U.S. Pat. No. 3,887,328, issued June 11, 1968, I described an apparatus for extruding foamed thermoplastic sheets in such a manner as to insure a uniform distribution of pressure flow at all points along the die lip to thereby eliminate strains or distortions in the extrudate and to accommodate the maximum widthwise expansion of the extrudate to prevent the formation of wrinkles thereon.

In another copending application Ser. No. 480,917, filed Aug. 19, 1965, now U.S. Pat. No. 3,479,694, issued Nov. 25, 1969, I described a continuous, integrated system for the manufacture of formed articles from foamed or cellular thermoplastics, preferably, but not necessarily, embodying an extrusion method and apparatus, such as described in my copending application Ser. No. 475,734, previously referred to.

In a still further copending application Ser. No. 506,805, filed Nov. 8, 1965, now U.S. Pat. No. 3,461,496, issued Aug. 19, 1969, I described a method and apparatus for extruding a sheet or tube of thermoplastic material having an expanded, cellular, inner structure and a relatively thin, unexpanded skin of the same material, molecularly integral with the expanded structure, covering at least one surface of the extrudate.

The present invention, therefore, resides in a unique combination of certain features of my copending applications above referred to to provide a continuous, uninterrupted apparatus for producing formed thermoplastic articles of foamed material and having one or both surfaces thereof coated with an integral skin of the same material or having selected areas of such surfaces thus coated. My previously described technique for forming skins or cellular thermoplastic extrudates was directed primarily to forming extrudates which are not immediately embodied in shaped article. However, this technique is particularly advantageous for producing an extrudate, and, then, without interruption, forming the final article with a skin on one or both surfaces or on selected areas of such surfaces.

Carefully controlled conditions are required for forming foamed articles from a previously extruded thermoplastic sheet, for example, where it is necessary to reheat the sheet and then form it by any one of the various thermoforming techniques currently used to produce articles from thermoplastic sheeting. It is not always possible to achieve the particular properties one desires utilizing conventional techniques. For example, where an orientated styrene film or sheet is laminated to a foam substrate, the orientation is considerably reduced or destroyed when the sheet is reheated sufficiently to permit adequate thermoforming operations. This is particularly true if deep draws are required to form the article. Another difficulty in conventional techniques results from the fact that the density of the foam is frequently adversely affected while the composite laminate is being heated, since the heat absorption and heat capacity of the nonfoamed skin is quite different from that of the foamed substrate. Perhaps most important of all is the fact that the conventional methods are two-step processes which require, first, the careful preparation of the composite sheet, and, second, the rather critical reheating and forming operation.

It is therefore an object of the present invention to provide apparatus whereby foamed articles having skin on one or both surfaces can be produced in an economical, continuous, uninterrupted process.

Another object resides in the provision of apparatus in which the skin does not seriously limit the depth to which the formed articles may be drawn.

A further object is to provide means for producing articles of controlled density cores and controlled thickness skins in which orientation has been established and yet not lost during the forming operation.

A still further object of the invention is to provide a continuous, uninterrupted apparatus for forming skin-coated articles of thermoplastic wherein the forming operation takes place as soon as possible after extrusion so as to utilize residual heat of extrusion and obviate the difficulties encountered in reheating the extrudate.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts in all views.

The invention may be carried out with the use of extrusion dies of various types and configurations, provided they are equipped adjacent their extrusion orifices with suitable means for chilling at least one surface of the extrudate to prevent expansion of said surface and form a skin as described in my copending application, above referred to, Ser. No. 506,805, filed Nov. 8, 1965. For illustrative purposes, the present invention will be described as embodying a diehead such as illustrated in FIG. 1 of said copending application.

Figure 1:
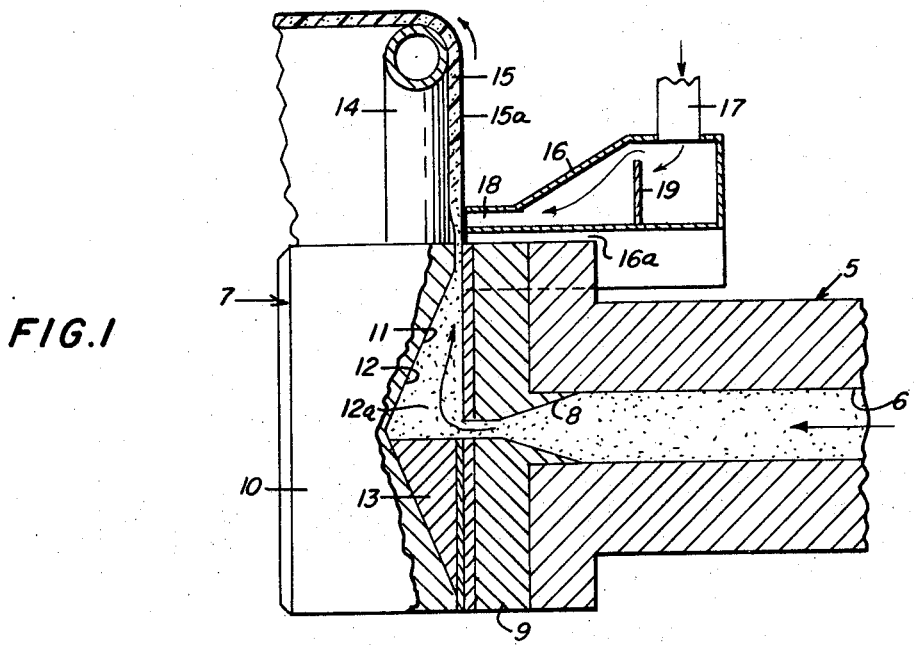
FIG. 1 is a sectional view of one form of extruder head such as contemplated by the present invention.

Referring to FIG. 1 of the drawings, 5 represents an extruder body having a longitudinally extending central passageway 6 fed from a suitable source of molten plastic (not shown). The discharge end of the passageway or barrel 6 passes through an extruder head 7 and preferably terminates in communication with a converging inlet port 8 located centrally of a circular die lip 9. An end cap 10, also circular in shape, registers with the die lip 9 and is secured in place by any suitable means, and the inner face of this end cap is conically recessed as at 11, providing a feed chamber 12 which is coaxial with the passageway 6 and converging opening 8. This chamber has diverging sidewalls which terminate in slightly axially and inwardly spaced relation to the periphery of the end cap 10. An adapter 13 conforms substantially to the surface contour of the chamber 12, with the exception that the upper portion thereof is provided with a V-shaped cutout area 12a which, when the adapter is installed, provides diverging radial confines for the chamber 12, providing a substantially fan-shaped reservoir of which the upper portion of the circular lip 9 forms the opposite wall, all as shown in my said copending application Ser. No. 475,734.

Also, as described in my said copending application, to facilitate the control of the extrudate after leaving the die lips, a mandrel 14 is provided adjacent the die lips. This mandrel preferably comprises a vertically disposed, transversely arcuate tube which is supported in an upright position so that as the extrudate 15 leaves the die lips, it is spread laterally and supported so as to provide a maximum possible accommodation of the widthwise expansion of the extrudate.

In applying the surface cooling means of the present invention to this type of extrusion head, an arcuate housing 16 is mounted immediately adjacent the discharge orifice from the extrusion chamber 12a. The housing is fed through tube 17 from a suitable source of cooled air or gas (not shown), and preferably converges at its discharge end to form an arcuate discharge slot 18 which is directed against the adjacent surface of the extrudate 15. Preferably, a baffle 19 15 provided in the housing 16 to facilitate uniformity of the flow of the cooling medium. As the extrudate 15 progresses from the extrusion chamber 12a, it expands rapidly. However, the surface which has been chilled to the desired degree remains unexpanded and provides an integral skin 15a, the thickness of which is directly controlled by the degree of cooling which has been provided through means of the cooling housing 16. While the skin stretches laterally, it does not undergo a three-dimensional expansion and remains as a molecularly integral covering for the underlying foamed resin 15. The skin covered extrudate 15—15a is then processed in the forming apparatus illustrated in FIG. 2 to produce a variety of foamed plastic articles.

It may be pointed out that the slot 18 is designed to facilitate the discharge of a high velocity, uniform flow of air or other cooling gas upon the adjacent surface of the extrudate to form the desired skin. The amount of gas, its rate of flow, temperature, and the rate of extrusion are all variables contributing to the thickness of the skin.

Preferably, an air space 16a is provided between the housing 16 and the extrusion head to maintain the proper cooling temperature in the housing and to avoid cooling the extruder head and die.

Figure 2:
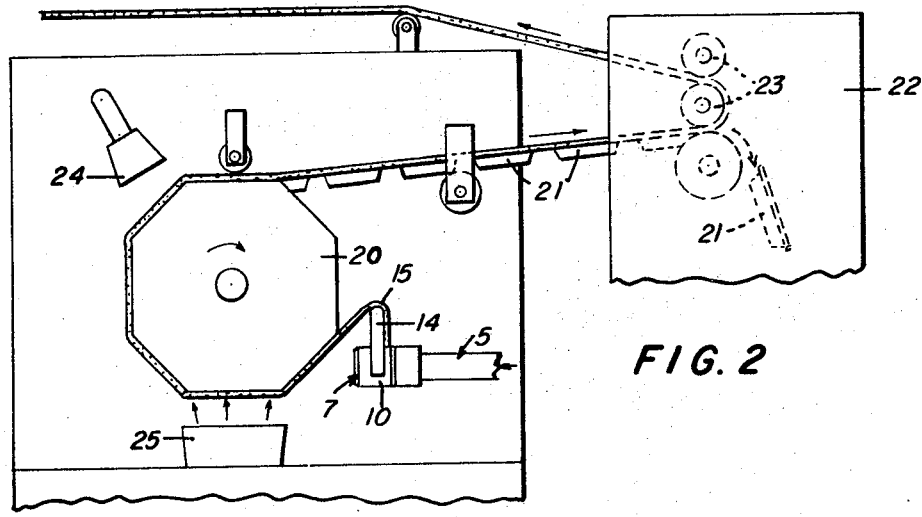
FIG. 2 is a diagrammatic view illustrating the combination of one form of extruder diehead with the forming apparatus.

Referring to FIG. 2 which diagrammatically illustrates the integrated system, an expandible thermoplastic material is extruded through the diehead 7, forming a continuous thermoplastic strip or sheet 15, having a skin coating on one or both of its surfaces. The sheet travels over the spreading yoke 14 from which it is conducted around the periphery of a forming wheel 20 of the type shown in my copending application Ser. No. 480,917 now U.S. Pat. No. 3,479,694 issued Nov. 25, 1969 which vacuum forms the articles 21 on the sheet 15. By sequential valving described in my said copending application, the vacuum is applied to the successive molds on the forming wheel as the sheet 15 is tangent to the respective flat faces on the underside of the forming wheel and after the sheet has been flattened and stretched by the spreading yoke 14.

The formed articles, while still carried by the sheet 15, are then stripped tangentially from the upper side of the forming wheel and the sheet and articles are conducted to the cutting unit 22 where the formed articles are removed from the sheet and directed to a stacking unit (not shown). The remaining selvage of sheet 15 is thereupon conducted to a granulating machine by means of the reverse guide rolls 23, all as described in my said copending application Ser. No. 480,917.

Air cooling means, such as diagrammatically shown at 24 and 25, may be directed against the indicated means of the sheet passing over the forming wheel 20 to facilitate the forming operation.

The combination of the present invention is not limited to the inclusion of a die structure such as shown in FIG. 1 for illustrative purposes, but may be of the type having straight die lips for extruding a flat sheet or circular die lips for extruding a tubular extrudate. The important feature resides in conducting the extruded sheet with its covering skin or skins directly to the forming operation immediately after extrusion so as to utilize the heat of extrusion to render the thermoplastic formable.

Another feature of the invention, where desirable, is that by controlling the cooling pattern of the cooling medium discharged through the housing 16 (FIG. 1) or other cooling unit and applying the cooling medium to selected areas of a surface of the extrudate where it is desirable to produce skin effects, it is perfectly feasible to produce a checkerboard effect in which every other space incorporates a skin of significant thickness with normal cell surfaces in between the spaces. Also, it is possible to form skins on selected areas only by controlling the interval of application of the cooling effect timewise in relation to the rate of extrusion.

As indicated in my copending application Ser. No. 506,805, now U.S. Pat. No. 3,461,496 issued Aug. 19, 1969, the cooling of the surface or surfaces of the extrudate may be effected by conductive cooling or by convective cooling, and in the former case it is preferable to coat the conductive cooling surfaces with an antifriction material such as polytetrafluorethylene.

In the embodiment of the die shown in FIG. 1, the cooling space 16a is relied upon to insulate the extrusion head from the cooling unit. This may also be accomplished by providing a thermal barrier between these two units. It is important that this thermal barrier or the insulating air space be sufficiently effective to maintain a sharp temperature gradient between the lips of the die and the skin producing element. A typical temperature profile would be to maintain the die body 7 at approximately the same temperature as the extrusion stock, for example 300° F. While the cooling unit 16 and the cooling medium is maintained at a temperature of perhaps 0° F.

Figure 3:
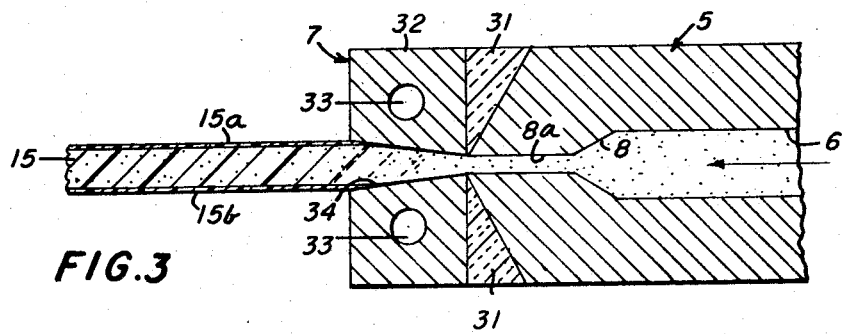
FIG. 3 illustrates a modified extruder head.

As previously indicated, the chilling of the surface of the extrudate may also be effected by conduction cooling means. For example, in FIG. 3 the discharge end of the extrusion head 7 is provided with an annular cooling ring 32 having passageways 33 for conducting a cooling fluid. This device includes insulating blocks 31 between the extrusion head and the ring 32 to maintain the full effect of the cooling medium without cooling the extrusion head.

In this form of the invention, a diverging, annular mouth 34 communicates directly with the discharge end of the extrusion orifice 8a, and, as the extrudate 15 passes through the mouth, both surfaces are cooled to the desired degree by the cooling effect of the ring 32, thus providing an extrudate with integral, unexpanded skins 15a and 15b on opposite surfaces thereof. Here again, if a skin covering is desired on only one surface of the extrudate, only one of the cooling passageways 33 is put into use.

Preferably, the conductive surface or surfaces of the mouth 34 are coated with polytetrafluorethylene or a similar low friction coating which will not materially inhibit heat transfer.

The divergence of the mouth 34 permits some expansion of the extrudate even as its surface is being chilled. However, a flat mouth or a partially flat and partially divergent mouth may be employed.

It is to be noted that this invention may be carried out not only in accordance with the invention disclosed in application Ser. No. 480,917, now U.S. Pat. No. 3,479,694, issued Nov. 25, 1969, but also in accordance with any technique where forming is employed immediately after extrusion and the heat of extrusion is relied upon to render the thermoplastic formable. Also to be noted is that the thickness of the outer skin, as well as the density of the expanded inner structure of the extrudate, may be readily controlled by this invention.

Further to be noted is that in the case where a soluble blowing agent is employed, an additional advantage of the method of this invention over a two-step process where the extrudate is reheated in order to be formed is that the blowing agent has not had time to escape and is still retained during the forming operation to further enhance the formability of the sheet due to its plasticizing effect. Also, in the application of this invention to extrudates containing soluble blowing agents the maximum orientation can be achieved in both the skin as well as the cell walls themselves. Orientation of the skin takes place as a result of the biaxial stretching of the extrudate as it emerges from the die and expands, and orientation of the cells takes place as a result of the blowing agent within each cell being under pressure at the time of forming and before the blowing agent escapes.

From the foregoing, it is believed that the invention may be readily understood by those skilled in the art without further description, it being borne in mind that numerous changes may be made in the details disclosed without departing from the spirit of the invention as set forth in the following claims.

I claim:

1. Apparatus for continuously manufacturing articles having an expanded inner structure of foamed thermoplastic extrudate and an unexpanded skin of said extrudate molecularly integral with at least one surface of the inner structure, said apparatus comprising a diehead assembly, a passageway in said assembly for feeding molten plastic having a foaming agent, said passageway communicating at its discharge end with die lips providing an elongated die orifice arcuate in a plane parallel to the width of the extrudate, means immediately posterior to said die orifice, disposed along at least one side thereof, for chilling the adjacent surface of extrudate as it emerges from said orifice to prevent expansion of the extrudate at said surface and form a molecularly integral, noncellular skin thereon, means to prevent chilling of said diehead and the lips of said die orifice, means posterior to said diehead assembly for laterally spreading the extrudate, and a molding assembly disposed closely posterior to said spreading means for receiving the spread extrudate, said spreading means comprising a yoke of arcuate contour substantially concentric to the axis of said die orifice, located in substantially the same plane as said orifice, and radially spaced therefrom a distance which is calculated to accommodate the transverse expansion of said extrudate after it leaves said orifice.

2. Apparatus as claimed in claim 1, wherein said chilling means comprises convective cooling means.

3. Apparatus as claimed in claim 1, wherein said chilling means comprises conductive cooling means.

4. Apparatus as claimed in claim 3, wherein said conductive cooling means has a conducting cooling surface coated with an antifriction material.

5. Apparatus as claimed in claim 1, wherein said molding assembly comprises a vacuum molding unit.

6. Apparatus as claimed in claim 5, wherein said molding unit comprises a rotatable forming wheel having a series of vacuum molds on its periphery.

7. Apparatus as claimed in claim 1, wherein said passageway has a portion which diverges to the opposite ends of said die lips.

8. Apparatus for continuously manufacturing articles having an expanded inner structure of foamed thermoplastic extrudate and an unexpanded skin of said extrudate molecularly integral with at least one surface of the inner structure, said apparatus comprising a diehead assembly, a passageway in said assembly for feeding molten plastic having a foaming agent, said passageway communicating at its discharge end with die lips providing an elongated die orifice arcuate in a plane parallel to the width of the extrudate, means immediately posterior to said die orifice, disposed along at least one side thereof, for chilling the adjacent surface of extrudate as it emerges from said orifice to prevent expansion of the extrudate at said surface and form a molecularly integral, noncellular skin thereon, means to prevent chilling of said diehead and the lips of said die orifice, and a molding assembly disposed closely posterior to said chilling means for receiving the extrudate.

9. Apparatus as claimed in claim 8, wherein said passageway has a portion which diverges to the opposite ends of said die lips.

* * * * *